United States Patent [19]

Mueller et al.

[11] Patent Number: 4,993,884
[45] Date of Patent: Feb. 19, 1991

[54] METHOD AND SPRAYING APPARATUS FOR APPLYING A LAYER OF AIR-SPRAYED CONCRETE

[75] Inventors: Karl-Hans Mueller, Bruchkoebel; Walter Barthel, Langenselbold, both of Fed. Rep. of Germany

[73] Assignee: Degussa Aktiengesellschaft, Frankfurt am Main, Fed. Rep. of Germany

[21] Appl. No.: 478,752

[22] Filed: Feb. 12, 1990

Related U.S. Application Data

[63] Continuation of Ser. No. 181,206, Apr. 13, 1988, abandoned.

[30] Foreign Application Priority Data

Apr. 30, 1987 [DE] Fed. Rep. of Germany ....... 3714386

[51] Int. Cl.$^5$ ................ B65G 53/00; B65G 53/52
[52] U.S. Cl. .......................... 406/49; 406/46; 406/48; 406/197; 406/191; 406/194; 106/737
[58] Field of Search ................ 406/46–49, 406/92, 93, 96, 98, 151, 153, 194–197, 191; 106/98

[56] References Cited

U.S. PATENT DOCUMENTS

| | | | |
|---|---|---|---|
| 1,139,091 | 5/1915 | Weber | 406/48 X |
| 1,598,558 | 8/1926 | Cohen | 406/48 |
| 1,889,480 | 11/1932 | Kelley | 406/11 X |
| 1,953,091 | 4/1934 | Westberg et al. | 406/93 X |
| 2,889,174 | 6/1959 | Schwing | 406/92 |
| 3,019,058 | 1/1962 | Pro | 406/94 |
| 4,111,711 | 9/1978 | Kiehl et al. | 106/98 X |
| 4,154,486 | 5/1979 | Nishikawa | 406/48 |
| 4,231,801 | 11/1980 | Dunton | 106/97 |
| 4,275,836 | 6/1981 | Egger | 406/84 X |
| 4,390,281 | 6/1983 | Scriminger | 406/48 X |
| 4,411,389 | 10/1983 | Harrison | 406/153 X |
| 4,433,943 | 2/1948 | Pao Chen | 406/48 X |
| 4,673,659 | 6/1987 | Wood et al. | 106/98 |

FOREIGN PATENT DOCUMENTS

| | | | |
|---|---|---|---|
| 2747247 | 4/1978 | Fed. Rep. of Germany | 406/93 |
| 1133362 | 1/1985 | U.S.S.R. | 406/48 |
| 819229 | 9/1959 | United Kingdom | 406/46 |

OTHER PUBLICATIONS

Article, "New Process for Wet Application of Shotcrete" (Pohl et al.) date 2/90.
Degussa AG Press Release, New Pro-Environmental Shotcrete Method, date 10/89.
Winnacker-Küchler, Chemische Technologie, vol. 3, Anorganische Technologie II, 4th Ed., Carl Hanser Verlag, Munich/Vienna, 1983, pp. 75–90.

Primary Examiner—Margaret A. Focarino
Assistant Examiner—James M. Kannofsky
Attorney, Agent, or Firm—Beveridge, DeGrandi & Weilacher

[57] ABSTRACT

Method of applying a layer of air-sprayed concrete onto a surface, wherein a pumpable and sprayable mixture of air-sprayable concrete is prepared from cement, aggregates, optional additives, and water. A given mass flow of the mixture of air-spray concrete is sprayed by means of a concrete feed pump through a concrete feed line to a spraying apparatus with a device for the introduction of propelling air under a feed pressure of several bars. The propelling air is charged with synthetic silica exhibiting a BET surface of at least 25 $m^2/g$. The synthetic silica is added with the propelling air into the mass flow of the mixture of air-spray concrete in such an amount that the applied air-spray concrete experiences a spontaneous temperature elevation of a few degrees Kelvin immediately after application. A spraying apparatus for the method is also shown.

15 Claims, 1 Drawing Sheet

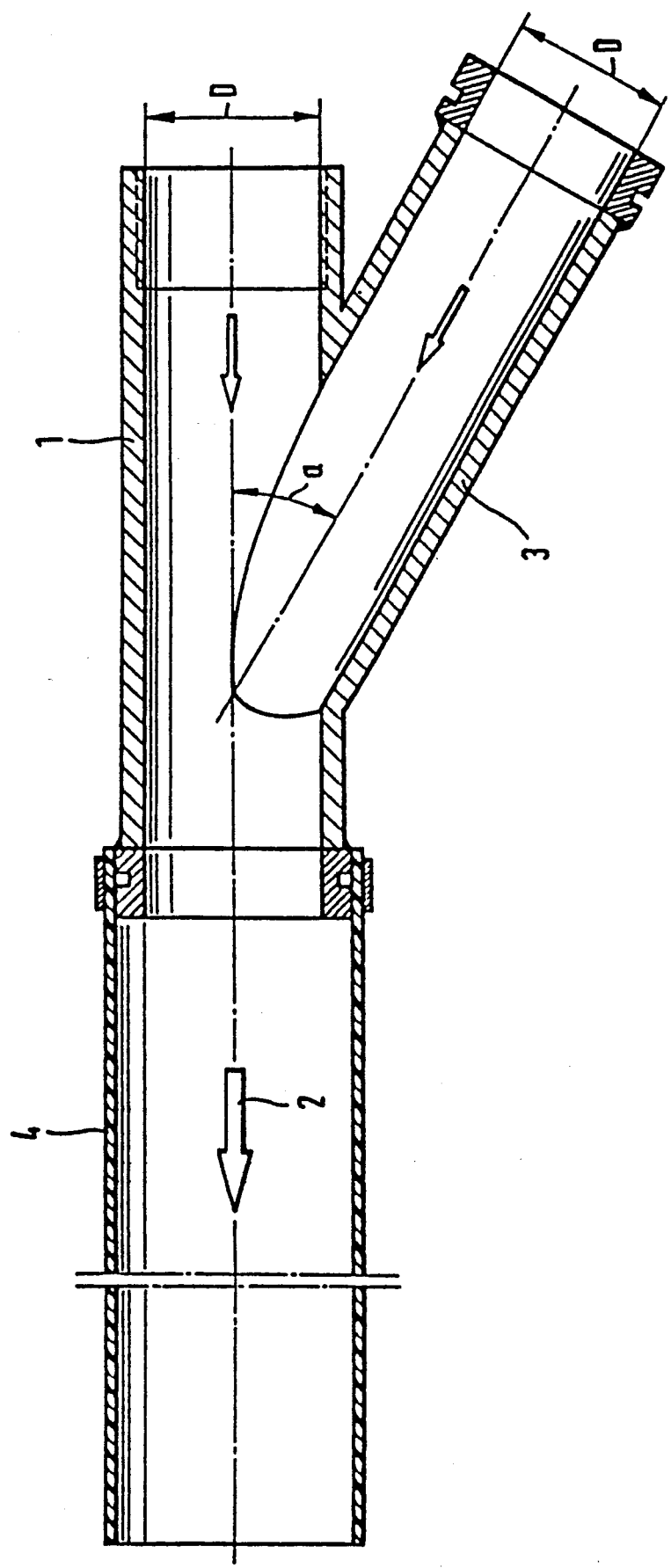

METHOD AND SPRAYING APPARATUS FOR APPLYING A LAYER OF AIR-SPRAYED CONCRETE

This application is a continuation of application Ser. No. 07/181,206 filed Apr. 13, 1988, now abandoned.

INTRODUCTION AND BACKGROUND

The present invention relates to a method for applying a layer of air-sprayed concrete onto a surface. In carrying out the invention, a pumpable and sprayable mixture of air-sprayed concrete is prepared from cement, aggregates, optional additives, and water. Utilizing a given mass flow of the mixture, the air-sprayed concrete mixture is fed with the aid of a concrete feed pump through a concrete feed line to a spraying apparatus. In operation there is employed a device for the introduction of propelling air which is under a feed pressure of several bars and whereby the mixture of air-sprayable concrete is sprayed onto the surface with the propelling air.

In a further aspect, the present invention also relates to a spraying apparatus with a device for the introduction of propelling air for carrying out the aforesaid method.

As used herein, the term "fillers" denotes finegrained fillers, especially flue dust. The additives can be e.g. accelerating admixtures or retarding admixtures as will be apparent to those skilled in the art. They can also be synthetic resin components. The expression "feed pressure" denotes the static pressure of the propelling air, which is supplied from an appropriate source of compressed air, or other gas at the point of introduction into the device for the charging propelling air.

Although the known techniques used in the art for accomplishing the spraying of concrete have proven themselves, there remains however, the problem that the setting or hardening time is relatively long. The pumpable and sprayable mixture of air-sprayable concrete includes excess water which is not consumed during the hydration reaction of the concrete. This increases the hardening time to a considerable degree, which adversely affects the thickness of the layer of air-sprayed concrete that can be applied during a spraying operation. In order to reduce the hardening time, the admixture of water glass to the mixture of air-sprayable concrete has previously been suggested.

However, this water glass additive has a disturbing action on the hardening process. Since water glass raises the pH of fresh concrete above the normal value of pH = 12.6, undesirable alkali silicate reactions can be responsible for the fact that the firmness of the hardened concrete occasionally exhibits a falling tendency as a function of the time.

SUMMARY OF THE INVENTION

It is an object of the present invention to reduce the hardening time without disturbing the chemical hardening process of the concrete. The air-sprayable concrete should change its weakly or soft, plastic consistency into a moist consistency in a very short time at impact and after impacting on the surface.

A feature of the present invention resides in a method for applying a layer of air-sprayed concrete onto a surface, utilizing a pumpable and sprayable mixture of air-sprayable concrete which is prepared from cement, aggregates, optional additives, and water. A given mass flow of the mixture of air-sprayable concrete is fed with the aid of a concrete feed pump through a concrete feed line to a spraying apparatus with a device for the introduction of propelling air at a feed pressure of several bars. As a result, the mixture of air-sprayable concrete is sprayed with the propelling air. In carrying out the invention, the propelling air is charged with synthetic silica which exhibits an inner surface of at least 25 m$^2$/g. The synthetic silica is brought with the propelling air into the mass flow of the mixture of air-sprayable spray concrete in such an amount that the applied air-placed concrete experiences a spontaneous temperature elevation of a few degrees Kelvin immediately after the application.

At the same time, the soft and weakly plastic consistency of the concrete is transformed into a damp consistency. Since the synthetic silica is brought with the propelling air into the mixture of air-spray concrete, the mixing occurs immediately before and during spraying. Of course, a correspondingly intimate mixing must be performed. The chemical reaction of concrete setting produced by the synthetic silica results in an elevation of temperature which occurs spontaneously. The temperature can be readily determined experimentally for a given mixture of air-spray concrete.

BRIEF DESCRIPTION OF DRAWING

The invention will be further understood with reference to the drawing which shows an apparatus for mixing the silica with the air-spray concrete.

DETAILED DESCRIPTION OF THE INVENTION

According to the present invention, the spontaneous temperature elevation is determined in order to effectively dose the amount of powdery synthetic silica in such a manner that a considerable reduction of the hardening time is achieved and, consequently, considerably greater layer thicknesses can be applied. It is an advantage that the synthetic silica contributes in the long term to an increase in strength of the hardened air-sprayed concrete. The synthetic silica is preferably brought into the mass flow of the mixture of air-sprayable concrete in such an amount that the spontaneous temperature elevation is 5–10 degrees Kelvin. This has the result in the case of customary mixtures of air-spray concrete that 0.5–8% by weight or more preferably 2–6 % by weight, or even more preferably approximately 4 % by weight, of synthetic silica in relation to the portion of cement is added with the propelling air into the mass flow of the concrete mixture.

In a preferred embodiment of the present invention, the propelling air under the feed pressure is charged with synthetic silica, which avoids the formation of flakes and clumps of synthetic silica.

A preferred embodiment of the present invention features charging the propelling air with a synthetic silica which exhibits an inner surface in a range between 35–700 m$^2$/g. A fine-grained accelerating admixture can be added within the scope of the invention to the synthetic silica before it is added or during its addition into the propelling air, e.g., 25–40 % by weight of an accelerating admixture can be added to the synthetic silica, wherein the total mixture is taken to be 100 % by weight.

The working operation can be performed within the scope of the invention with all customary mixtures of air-spray concrete, especially with those which contain a synthetic resin component. A mixture of air-spray concrete has proven to be suitable which comprises approximately 360 kg/m³ cement, 1760 kg/m³ aggregate of the particle-size distribution curve Ba/Ca and 200 kg/m water. It is advantageous if the cement is a Portland cement 45 F. These materials are known in the art.

The silica used as synthetic silica in the method of the invention can be those known in the art such as described in Winnacker-Küchler, Chemische Technologie, vol. 3, Anorganische Technologie II, 4th Edition, Carl Havser Verlag, Munich/Vienna, 1983, pp. 75 to 90.

Of particular importance are pyrogenic silica prepared by flame hydrolysis as well as precipitated silicas, and wherein precipitated silica are preferred in the method of the invention.

The precipitated silicas can be added unground or steam-jet ground, and spray-dried or spray-dried and ground.

For example, the following precipitated silicas can be used, and wherein the precipitated silica FK 320 DS is preferred.

|  |  |  | FK320 DS | Durosil | Sipernat 22 | Sipernat 22 S |
|---|---|---|---|---|---|---|
| Surface area BET | (1) | m²/g | 170 | 60 | 190 | 190 |
| Average size of primary particles |  | nm | 18 | 40 | 18 | 18 |
| Stamping density | (2) | g/l | 80 | 210 | 270 | 120 |
| pH | (3) |  | 6.3 | 9 | 6.3 | 6.3 |
| Sieve residue Mocker 45 m | (4) | % | 0.01 | 0.3 | 0.5 | 0.1 |
| Drying loss (2 h, 105° C.) | (5) | % | 6 | 6 | 6 | 6 |
| Ignition loss (2 H, 1000° C.) | (5) (6) | % | 5 | 6 | 5 | 5 |
| SiO₂ | (7) | % | 98 | 98 | 98 | 98 |
| Na₂O | (7) | % | 1 | 1 | 1 | 1 |
| Fe₂O₃ | (7) | % | 0.03 | 0.03 | 0.03 | 0.03 |
| SO₃ | (7) | % | 0.8 | 0.8 | 0.8 | 0.8 |

(1)According to DIN 66 131.
(2)According to DIN 53 194 (non-sieved), ISO 787/XI or JIS K 5101/18.
(3)According to DIN 53 200 (in 5% aqueous dispersion), ISO 787/IX, ASTM D 1208 or JIS K 5101/24.
(4)According to DIN 53,580, ISO 787/XVII or JIS K 5101/20.
(5)According to DIN 55,921, ASTM D 1208 or JIS K 5101/23.
(6)In relation to the substance dried 2 hours at 105° C.
(7)In relation to the substance annealed 1 hours at 1000° C.
(8)In water: methanol = 1:1.
(9)Contains approximately 3% chemically bound carbon.
(10)Contains approximately 2% chemically bound carbon.

|  |  |  | Extrusil |
|---|---|---|---|
| Surface (Bet) | (1) | m²/g | 35 |
| Average size of primary particles |  | nm | 25⁽⁹⁾ |
| Stamping density | (2) | g/l | 300 |
| Ph | (3) |  | 10 |
| Sieve residue Mocker 45 um | (4) | % | 0.2 |
| Drying loss (2 h, 105° C.) | (5) | % | 66 |
| Annealing loss (2 h, 1000° C.) | (5) (6) | % | 7 |
| SiO₂ | (7) | % | 91 |
| Al₂O₃ | (7) | % | 0.2 |
| CaO | (7) | % | 6 |
| Na₂O | (7) | % | 2 |
| Fe₂O₃ | (7) | % | 0.03 |
| SO₃ | (7) | % | — |
| Cl⁻ | (7) | % | 0.8 |

(1)According to DIN 66 132.
(2)According to DIN 53 194 (non-sieved), ISO 787/XI or JIS K 5101/18.
(3)According to DIN 53 200 (in 5% aqueous dispersion), ISO 787/IX, ASTM D 1208 or JIS K 5101/24.
(4)According to DIN 53 380, ISO 787/XVII or JIS K 5101/20.
(5)According to DIN 55 921, ASTM D 1208 or JIS K 5101/23.
(6)In relation to the substance dried 2 hours at 105° C.
(7)In relation to the substance annealed 2 hours at 1000° C.
(8)Cannot be measured in reproducible fashion.
(9)The size of the primary particles cannot be precisely determined in the case of silicates on account of heavy intergrowths.
(10)Total annealing loss, 1 h 800° C.
(11)In relation to the substance annealed 1 h at 800° C.

The determination of the physical and chemical characteristic data is made according to the following methods:

pH (according to DIN 43 200)

The pH is determined electrometrically with a glass electrode and a pH meter. The pH of silica is generally in the neutral range whereas that of silicates is in the slightly alkaline range.

Sieve residue (according to DIN 43 580)

The sieve residue is an indicator for the degree of granularity. In order to detect the amounts of components which can not be dispersed or can only be dispersed with difficulty occurring in very minute amounts in precipitated silica and silicates, the sieve residue is determined according to Mocker. In this method, a silica suspension is washed with 4 bars water pressure through the sieve. The sieve is then dried and the sieve residue weighed out [tared]. 45- micrometer sieves are used which correspond to 325 meshes (according to ASTM).

Surface according to BET (DIN 66 131)

The surface of silica and silicates is measured according to the BET method in m²/g.

The method is based on the adsorption of gaseous nitrogen at the temperature of liquid nitrogen. The area meter method according to Haul and Dembgen can be used with advantage. A calibration is required. Both the "inner" and the "outer" surface are determined.

Average size of the primary particles

The average size of the primary particles can be determined with photographs by electron microscopes. To this end, the diameters of approximately 3,000–5,000 particles are determined and their arithmetical average calculated. The individual primary particles are generally not present in isolated form but rather are combined to aggregates and agglomerates. The "agglomerate" particle size of precipitated silicic acids and silicates is a function of the grinding process.

Stamping density (according to DIN 53 194)

This is an indication of measurement for the weight of the powdery product. Approximately 200 ml silica are stamped in the measuring cylinder of the stamping volumeter 1,250 times. The stamping density is calculated from the weight of the material and the volume and indicated in g/l.

Drying loss (according to DIN 55 921)

The precipitation products contain a small amount of physically bound water. After 2 hours drying in an air oven at 105° C., the bulk of the physically bound water has been removed.

Ignition loss (according to DIN 55 921)

After 2 hours annealing time at 1000° C., the water chemically bound in the form of silanol groups has also been removed. The annealing loss is determined with the substance dried 2 h at 105° C.

Precipitated silica FK 320 DS is a precipitated silica which was steam-jet ground after rotary drying.

Precipitated silica Durosil is an unground, rotary-dried, precipitated silica.

Precipitated silica Sipernat 22 is a spray-dried, precipitated silica.

Precipitated silica Sipernat 22 S is a spray-dried and ground, precipitated silica.

The method of the invention can be performed in two different ways:

The wet spraying method. A mixture of concrete prepared in advance in a concrete mixing system is transported to the construction site and sprayed on by a spraying machine with the addition of compressed air.

The dry spraying method. A packaged mixture of all aggregates which is as dry as possible is compounded at the construction site with water, using a special mixing nozzle, and applied as a ready mixture of concrete.

In accordance with a feature of the invention an air-spray concrete, applied according to the dry or the wet spraying method, is improved as to its usage and its quality. The precipitated silica (e.g. FK 320 DS) is added to the concrete in an amount of approximately 0.5–8 % by weight in relation to the amount of cement.

The action of the silica is based on a setting hardening of the air-spray concrete. Mixing water is spontaneously drawn out from the concrete mass by action of attachment to the silica but is later resupplied to the hardening process. The removal of water signifies that the setting action of the air-sprayed concrete is increased. Spraying tests showed that the rebound or fall off is reduced, which reduces material losses. Orienting tests indicate that the rebound can be reduced from the usual figure of approximately 30 % by weight to 10–20 % by weight.

In the alkaline medium of the hydraulically setting concrete (pH range >12), the silica acts during the hardening as an active substance which improves the properties of the concrete. Bending strength tests showed an increase of 15–30 % as a result of the addition of approximately 2 % by weight precipitated silica in relation to the cement content.

This increase of strength is based on the reaction of the precipitated silica with the excess $Ca(OH)_2$ of the cement concrete >pH 12. The formation of calcium silicate hydrates leads to a setting within the structure of the artificial concrete stone. Thus, the precipitated silica as additive effects an improvement of the quality of the air-sprayed concrete as regards its carrying capacity. If high strength values are not desired, the cement portion can be reduced, which is economically advantageous.

The addition of precipitated silicas to air-sprayable concrete compositions thus results in improvements including the following:
Decrease of the rebound during the spraying process. Savings of material results in economic advantage.
Higher strength of the hardened concrete results in greater carrying capacity which is a technical advantage.
Reduction of the cement portion by activation in the case of defined strength values which means an economic advantage.

These modes of operation are independent of the type of the method of air-placed concrete.

In the wet spraying method the precipitated silica is added directly into the flow of concrete in or before the spraying nozzle and homogeneously mixed.

In the dry spraying method the precipitated silica is added in advance to the dry mixture, which is either packaged or produced at the construction site. In this case, only water is added in the nozzle.

Precipitated silicas are used in air-sprayed concrete to improve the properties of the concrete, especially for use in tunnel construction and when repairing concrete (reconstruction).

The present invention as mentioned also relates to a spraying apparatus for carrying out the described method. This apparatus is shown in the drawing. The single FIGURE shows a longitudinal section through such a spraying apparatus.

The FIGURE shows a straight guide tube 1 for the propelling air charged with synthetic silica and shows a supply tube 3 fitted into straight guide tube 1 and oriented obliquely in the direction of spraying indicated by arrow 2. Supply tube 3 is for the mixture of air-sprayable concrete which was previously prepared and supplied by the concrete feed pump. The spraying apparatus can also be connected in another manner so that straight guide tube 1 is used for the guidance of the mixture of air-sprayable concrete and obliquely introduced supply tube 3 is used for the propelling air charged with synthetic silica. In this preferred embodiment of the invention, a hose 4 which can be guided by an operator during the application of the air-sprayable concrete is connected to straight guide tube 1. This hose 4 functions at the same time as a turbulence or vortexing lance or turbulence hose. A turbulence tube could also be used in an analogous manner. As concerns the concrete feed line, straight guide tube 1 can also be designed as a nozzle and be provided to this end with a constriction in which the static pressure is converted into kinetic energy. The spraying apparatus shown is adjusted for a feed pressure of the propelling air of over 5 bars, preferably of approximately 8 bars. To this end, guide tube 1 and supply tube 3 exhibit an inner diameter D of approximately 50 mm. Angle of introduction, a, is approximately 30° C. It should be understood that many different types of sprayable concrete can be used according to this invention. These substances and compositions are well known in the art.

Further variations and modifications of the foregoing will be apparent to those skilled in the art and are intended to be encompassed by the appended claims German priority application P 37 14 386.7-22 is relied on and incorporated herein.

We claim:

1. A method for applying a layer of air-sprayable concrete onto a surface, comprising:
providing a pumpable and sprayable mixture of air spray concrete comprising cement, aggregates, and water;
feeding a given mass flow of the mixture of air sprayable concrete so obtained through a concrete feed means to spraying means;
introducing propelling air into said concrete feed means at a feed pressure above atmospheric; and mixing precipitated silica having an inner surface in a range between 35–700 $m^2/g$ with said cement such that said air-spray concrete includes precipitated silica and the mixture of air-sprayable concrete and silica is sprayed with the propelling air and, while said air sprayable concrete is being sprayed by the propelling air, the mixing of the water and the precipitated silica results in the water being spontaneously drawn out from the concrete by action of attachment to the silica, and said precipitated silica and propelling air are introduced into the mass flow of said mixture of air sprayable concrete in such an amount that the applied air-sprayed concrete experience a spontaneous temperature elevation of at least 2 degrees Kelvin immediately after the application of said sprayable concert to a surface.

2. The method according to claim 1, wherein the precipitated silica is added into the mass flow of the mixture of air-sprayable concrete in such an amount that the spontaneous temperature elevation is 5 to 10 degrees Kelvin.

3. The method according to claim 1, wherein 2–6 % by weight of precipitated silica in relation to the portion of cement is added with the propelling air into the mass flow of the mixture of air-sprayable concrete.

4. The method according to claim 1, wherein approximately 4 % by weight precipitated silica in relation to the portion of cement is added into the mass flow of the concrete mixture.

5. The method according to claim 1, wherein the propelling air under the feed pressure is charged with the precipitated silica.

6. The method according to claim 1, wherein the propelling air is charged with the precipitated silica and the precipitated silica is mixed with a fine-grained accelerating admixture before or during its addition into the propelling air.

7. The method according to claim 6, wherein the percentage by weight of the accelerating admixture is 20–45% of the weight of the combined mixture of precipitated silica and accelerating admixture.

8. The method according to claim 1 wherein the mixture of air-sprayable concrete comprises approximately 360 $kg/m^3$ cement, 1760 $kg/m^3$ aggregates of the particle-size distribution curve Ba/Ca and 200 $kg/m^3$ water.

9. The method according to claim 8 wherein Portland cement 45 F is used.

10. A method as recited in claim 1 wherein the precipitated silica added to said concrete is added in an amount approximately 0.5×8% by weight in relation to the amount of cement.

11. A concrete spraying apparatus, comprising:

means for the introduction of propelling air comprising a straight guide tube (1) for propelling air, at least one supply tube (3), obliquely oriented into the straight guide tube (1) at an angle of introduction and in the direction of spraying, for the mixture of air-sprayed concrete which includes cement, and spraying material comprising precipitated silica with the precipitated silica added to said concrete in an amount of approximately 0.5–8% by weight in relation to the amount of cement and said precipitated silica having an inner surface are within the range of about 35 to 700 $m^2/g$.

12. The spraying apparatus according to claim 11 further including a turbulence hose (4) connected to the straight guide tube (1).

13. Spraying apparatus according to claim 11, wherein the guide tube (1) and the supply tube (3) exhibit an inner diameter (D) of approximately 50 mm and that the angle of introduction (a) is approximately 30°.

14. A concrete spraying apparatus, comprising:

straight guide tube means (1) for the propulsion of cement and for the mixture of air-sprayable concrete, at least one supply tube (3), introduced obliquely into the straight tube in the direction of spraying, for the propelling of air charged with precipitated silica, said precipitated silica comprising 0.5–8% by weight of the cement and having an inner surface within the range of about 35 to 700 $m^2/g$.

15. The spraying apparatus according to claim 14 further including a turbulence hose (4) connected to the straight guide tube (1).

* * * * *